April 2, 1968     H. BIEBER ET AL     3,376,318

PROCESS FOR SEPARATION OF HIGH-ENERGY PROPELLANT OXIDIZERS

Filed March 9, 1962     2 Sheets-Sheet 1

Herman Bieber
Harry M. Taylor
Lawrence Spenadel     Inventors

By *Henry Berk*

Patent Attorney

April 2, 1968  H. BIEBER ET AL  3,376,318
PROCESS FOR SEPARATION OF HIGH-ENERGY PROPELLANT OXIDIZERS
Filed March 9, 1962  2 Sheets-Sheet 2

Herman Bieber
Harry M. Taylor  Inventors
Lawrence Spenadel

By  *Henry Berk*  Patent Attorney

United States Patent Office 3,376,318
Patented Apr. 2, 1968

3,376,318
PROCESS FOR SEPARATION OF HIGH-ENERGY PROPELLANT OXIDIZERS
Herman Bieber, Kenilworth, N.J., Harry M. Taylor, New York, N.Y., and Lawrence Spenadel, Fanwood, N.J., assignors to Esso Research and Engineering Company, a corporation of Delaware
Filed Mar. 9, 1962, Ser. No. 179,522
4 Claims. (Cl. 260—347.7)

This invention relates to a method of separating by liquid-liquid extraction a difluoramino organic compound having a higher number of $NF_2$ groups from a mixture thereof with a compound containing fewer $NF_2$ groups in the molecule. The $NF_2$ groups are linked to carbons, and herein these difluoramino organic compounds are termed $CNF_2$ compounds.

With synthesis of relatively high molecular weight, low volatility, $CNF_2$ compounds, e.g. those containing 4 to 12 or more carbon atoms per molecule, larger scale separation of such compounds, especially from mixtures of compounds with similar carbon structures according to their $CNF_2$ content, has become a difficult problem. Fractional distillation under vacuum has its limitations and is often not feasible. Gas chromatography has lessened value for separation of low volatility liquid and solid compounds and for larger scale operations. Moreover, partition chromatography in the conventional manner has given difficulties in separation when a suitable solid adsorbent was not used, and when the rate of flow is not extremely slow.

Now, in accordance with the present invention, a liquid-liquid extraction technique with proper solvents is provided for efficient separation of $CNF_2$ compounds of relatively low volatility based on preferential solvent action for $CNF_2$ compounds of higher $NF_2$ content by a liquid halocarbon solvent which is not miscible with a hydrocarbon liquid that preferentially dissolves the $CNF_2$ compound of lower $NF_2$ content.

In the synthesis of many $CNF_2$ compounds, mixtures are obtained of the derivatives containing varying numbers of $NF_2$ groups linked to carbon atoms. The organic compound used as a reactant in the synthesis of the $CNF_2$ compounds may be an olefin, diolefin, triolefin, unsaturated cyclic ethers, cycloalkadienes, and aromatic hydrocarbons, and such compounds containing halogen substituents or other functional groups. In the reactions of such compounds with $N_2F_4$, $NF_2$ groups add to one or more double bonds to form mono-$(NF_2)$, bis-$(NF_2)$, tris-$(NF_2)$, tetrakis-$(NF_2)$, and pentakis-$(NF_2)$ adducts. In some, $NF_2$ groups are substituted for hydrogen, halogen or other reactive atom or functional group.

An example of a product mixture requiring isolation or concentration of $CNF_2$ components having higher energy value (higher $NF_2$) content is a mixture of tetrakis-$(NF_2)$-tetrahydrofuran with the bis-$(NF_2)$ furan adduct, bis-$(NF_2)$-dihydrofuran.

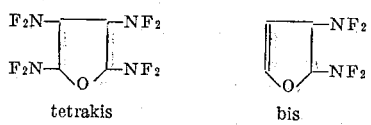

tetrakis      bis

Similarly, there are many other product mixtures for which the liquid-liquid extraction treatment is appropriate for isolating or concentrating the components having higher $NF_2$ content, e.g. components having 4 or more $NF_2$ groups per molecule from components having fewer $NF_2$ groups per molecule. Examples of such mixtures are: (1) a mixture of pentakis-$(NF_2)$ pentane with mono-$(NF_2)$, bis-$(NF_2)$ and tris-$(NF_2)$ derivatives of 1,5-iodo-2,3-pentadiene; (2) tetrakis-$(NF_2)$ butane with bis-$(NF_2)$ butene; (3) pentakis-$(NF_2)$ and tetrakis-$(NF_2)$ derivatives of cyclohexadiene mixed with lower $NF_2$ adducts and substitution derivatives of cyclohexadiene; (4) mixtures derived from reaction of benzene with $N_2F_4$.

The preferred liquid-liquid extraction method for separating the components of a mixture with respect to their $CNF_2$ group contents utilizes a double solvent in a multistage countercurrent system. Each of the two solvents employed should have low solubility for the other. One of the solvents, characterized by benzene, a liquid hydrocarbon, or similar organic compound of relatively low dielectric constant (e.g. a dielectric constant in the range of about 1.8 to 2.5), has a preferential solubility for the components of low $NF_2$ group contents. The other solvent, which is more polar, such as a polyhalogenated hydrocarbon, has preferential solubility for the components of higher $NF_2$ group contents. Each of the solvents must be separable from the solutes, as by distillation.

As a model extraction system chosen for demonstrating the invention, a mixture of bis-$(NF_2)$ and tetrakis-$(NF_2)$ adducts was used with the solvent pair of benzene and perfluoro 3,4-dimethylhexane (PDH). A "Craig" multistage extractor like that described in "Technique of Organic Chemistry," vol. III, p. 285 (1950), Interscience was used.

A method for determining proper solvents for obtaining satisfactory separation of the mixed $NF_2$ adducts involves first determining the distribution coefficient for each of the solute components in the two solvents with variation of the concentration of the solute component. The distribution coefficient may be expressed as the ratio of the concentration of the particular solute component in each of the separate solvent phases. Thus the distribution coefficient for the bis-$(NF_2)$ furan adduct is:

$$K_b = \frac{\text{bis adduct in PDH phase}}{\text{bis adduct in benzene phase}}$$

The distribution coefficient for the tetrakis-$(NF_2)$ furan adduct is:

$$K_t = \frac{\text{tetrakis adduct in PDH phase}}{\text{tetrakis adduct in benzene phase}}$$

The separation factor or selectivity can then be determined for various concentrations of the solute components in one phase and the varying mole ratios of the solute components in the feed mixture. The separation factor or selectivity is:

$$\beta = K_t/K_b$$

By using the solubility relationships thus determined, the number of theoretical stages required for a desired degree of separation can readily be calculated for any feed composition, provided there are no characteristics which alter the relationships, e.g. interactions of the solutes in the solvents. No such interactions were found and the experimental data agreed quite well with the predicted separation. The technique used for determining suitable solvent pairs and for carrying out the separation will be described in reference to the drawings, wherein.

Figure 1:
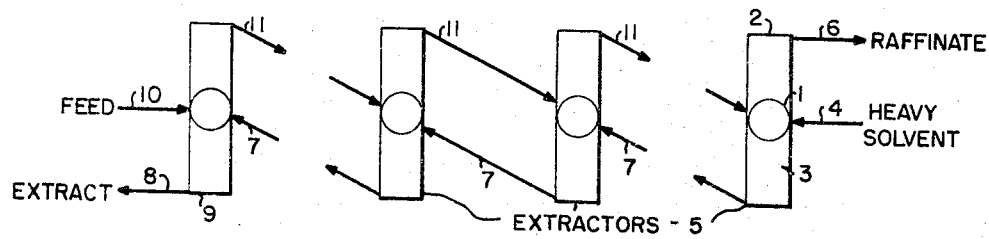
FIGURE 1 is a schematic showing of a multistage extractor for continuous countercurrent flow of the solvents and their extracts.

The FIGURE 1 extractor is shown to comprise a number of interconnected units, as provided, with a mixing or equilibration zone or chamber 1, a decanting zone 2, and a settling zone 3. The heavier solvent, e.g. the PDH, which preferentially extracts the tetrakis-(NF$_2$) furan adduct, may be passed by line 4 into the mixing zone 1 of a terminal unit 5, from which the raffinate (bis adduct in the benzene solvent) is decanted through line 6. The settled extract of tetrakis-(NF$_2$) adduct and the PDH layer is made to pass countercurrently in through lines 7 to the mixing zone 1 of the preceding unit and, similarly, from each settling zone in the mixing zone of a preceding unit, until the extract is withdrawn through line 8 from an end unit 9. The feed of the mixed bis- and tetrakis-(NF$_2$) adducts in benzene is led into the mixing zone of one of the units, such as the final unit 9 through line 10. The raffinate of the bis adduct concentrated in the benzene layer, which is decanted in each of the units, is passed by lines 11 to the mixing zone of each following unit and the final raffinate is withdrawn through line 6. The final raffinate may be passed to a fractionator for stripping off the benzene. The final extract withdrawn through line 8 is passed to another fractionator or stripping zone for separating the tetrakis-(NF$_2$) adduct from the PDH.

Figure 2:
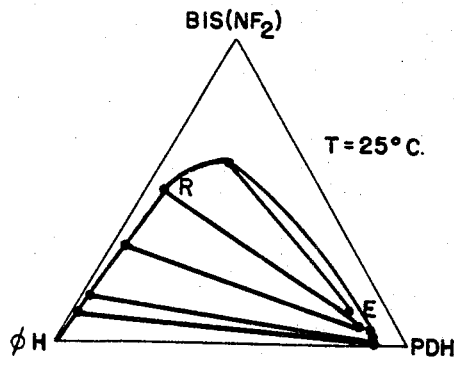
FIGURE 2 is a ternary equilibrium diagram for the system of bis-$(NF_2)$ furan adduct with the solvent pair, benzene and PDH.

As shown in FIGURE 2, the bis-(NF$_2$) adduct has a low solubility in the PDH relative to its solubility in the benzene, and the distribution coefficient, $K_b$, decreases as the concentration of the bis adduct is increased in the benzene phase. This relationship is indicated by the tielines in FIGURE 2. The concentration of the bis adduct in the benzene phase is indicated for one end of the tieline, R, while the concentration of the bis adduct in the PDH phase or extract phase is at the other end of the tieline, or point E. The change in $K_b$ with concentration of the bis adduct in the benzene phase is given in the following table:

TABLE I.—BIS-(NF$_2$) ADDUCT OF FURAN EQUILIBRIUM PDH/BENZENE LIQUID PHASE

Mole percent bis-(NF$_2$)
adduct in benzene phase: | $K_b$
--- | ---
6.5 | 0.15
10.6 | 0.14
15.7 | 0.13
32.2 | 0.12

Figure 3:
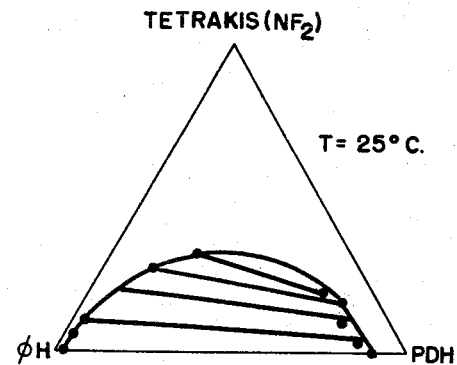
FIGURE 3 is the ternary equilibrium diagram for the system of tetrakis-$(NF_2)$ furan adduct with the solvent pair, benzene and PDH.
Figure 4:
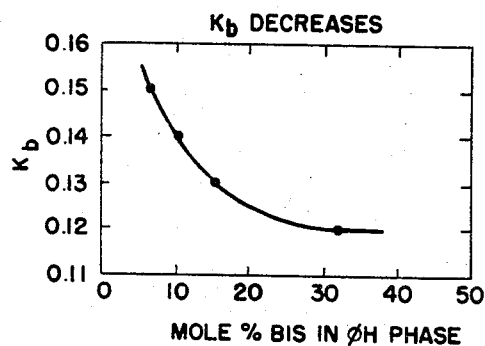
FIGURE 4 shows the relationship of $K_b$ to the concentration of the bis adduct in the benzene phase.
Figure 5:
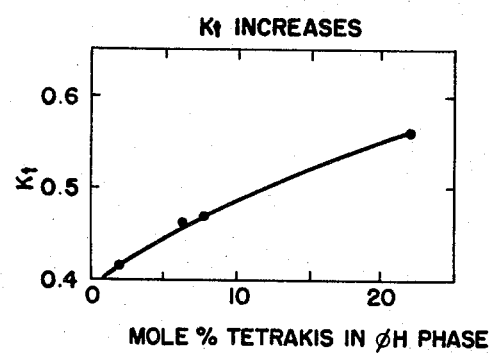
FIGURE 5 shows the relationship of $K_t$ to the concentration of the tetrakis adduct in the benzene phase.

As shown in FIGURES 3 and 4, the tetrakis-(NF$_2$) adduct has a much greater solubility in the liquid PDH phase with increasing concentration in the benzene phase, yet has a lower solubility than the bis adduct in the benzene phase. These relationships are further brought out by the data in the following table:

TABLE II.—PARTITION COEFFICIENT FOR TETRAKIS-(NF$_2$) FURAN ADDUCT

Mole percent tetrakis-(NF$_2$)
adduct in benzene phase: | $K_t$
--- | ---
21.9 | 0.56
7.9 | 0.47
6.5 | 0.46
2.1 | 0.42

Figures 6, 7:
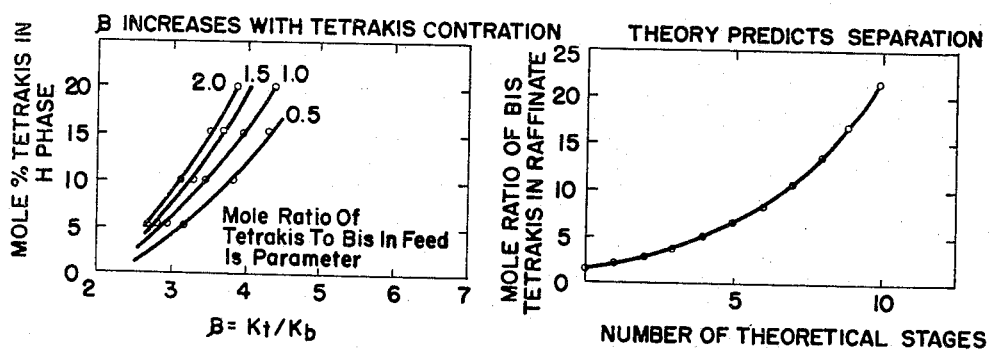
FIGURE 6 shows the relationship of the separation factor to the concentration of the tetrakis adduct in the benzene phase for varying mole ratios of the solute components.
FIGURE 7 shows the number of stages required in a multistage separation using the double solvent for a given mixture of the solute components to be separated.

In FIGURE 6 it is shown that with increased concentration of the tetrakis-(NF$_2$) furan adduct in the feed, the separation of the tetrakis-(NF$_2$) adduct by extraction into the PDH liquid phase is increased. It will be noted that the selectivity $\beta$ increases as $K_b$ decreases, and $K_b$ decreases as the mole ratio of the tetrakis to the bis component decreases, or concentration of bis in the benzene increases.

FIGURE 7 shows the number of stages of extraction for any given mole ratio of the bis adduct to the tetrakis adduct to be left in the raffinate. The number of theoretical stages required for this can be calculated for a given feed, given raffinate solvent, and given extract solvent. In FIGURE 7, benzene and PDH are the solvents. The feed is 32 mole percent bis, 21.8 mole percent tetrakis, and 46.2 mole percent benzene. It is thus indicated that for increased separation efficiency, the concentration of the tetrakis adduct should be increased both with respect to the concentration of the bis adduct and the amount of benzene.

The separation efficiency is the percent of theoretical separation obtained and is dependent on the concentration of the tetrakis-(NF$_2$) adduct with respect to the bis-(NF$_2$) adduct in the benzene phase, and also on the use of a suitable mixing time to obtain equilibrium, as shown in the following table:

TABLE III.—FACTORS IN SEPARATION EFFICIENCY

| Feed (Mole Percent in Benzene) | | Mixing Time, mins. | Separation Efficiency, Percent |
| --- | --- | --- | --- |
| Bis | Tetrakis | | |
| 5.91 | 3.82 | 0.5 | 10.0 |
| 9.79 | 2.45 | 0.5 | 17.0 |
| 32.0 | 21.8 | 0.5 | 21.5 |
| 32.0 | 21.8 | 10.0 | 48.0 |
| 32.0 | 21.8 | 20.0 | 85.0 |

The technique that has been described can be applied using a relatively nonpolar hydrocarbon liquid solvent for dissolving the solute component of lower NF$_2$ group content in equilibrium with the more polar polyhalogen or perfluoro carbon liquid solvents which preferentially dissolve the compounds of higher NF$_2$ content, generally when each of said solute components has the same number of carbon atoms or carbon-containing structure.

What is claimed is:

1. The method of separating CNF$_2$ organic compounds having a higher number of NF$_2$ groups from said compounds having a lower number of NF$_2$ groups by liquid-liquid extraction which comprises, contacting the mixture of CNF$_2$ compounds with a liquid hydrocarbon solvent having a low dielectric constant in the range of about 1.8 to 2.5 which dissolves preferentially the CNF$_2$ compounds having a lower number of NF$_2$ groups, and simultaneously contacting said mixture of CNF$_2$ compounds with a polyhalogenated organic compound which is more polar than and immiscible with the liquid hydrocarbon solvent and which preferentially extracts the CNF$_2$ compounds of higher proportion of NF$_2$ groups, mixing the solutions of said solvents with the CNF$_2$ compounds dissolved in each of the solvents to obtain substantially an equilibrium distribution, then separating the resulting extract solution of CNF$_2$ compound containing a higher proportion of the NF$_2$ groups from the resulting raffinate phase of CNF$_2$ compounds of low NF$_2$ group content in the hydrocarbon solvent.

2. The method of separating a CNF$_2$ organic compound having a higher number of NF$_2$ groups attached to its carbon constituents from a CNF$_2$ organic compound having a lower number of NF$_2$ groups attached to its carbon constituents using a liquid-liquid extraction, said CNF$_2$ compounds being CNF$_2$ adducts of an organic compound containing double bonds and 4 to 12 carbon atoms per molecule, which comprises contacting a mixture of the CNF$_2$ compounds with a liquid hydrocarbon solvent having a dielectric constant number of about 1.8 to 2.5 to dissolve the CNF$_2$ compounds, contacting the liquid hydrocarbon solution of the CNF$_2$ compounds with a polyhalogenated organic compound solvent which is more polar than the liquid hydrocarbon solvent and immiscible therewith to preferentially extract the CNF$_2$ compound having a higher number of NF$_2$ groups in the polyhalogenated organic compound, mixing the solutions of said solvents with the CNF$_2$ compounds dissolved in each of the solvents to obtain a distribution of the CNF$_2$ compounds, separating a resulting extract solution of the $CNF_2$ compound having a higher number of $NF_2$ groups dissolved in the more polar solvent from the resulting raffinate phase of the $CNF_2$ compound having a lower number of $NF_2$ groups dissolved in the hydrocarbon solvent, and recovering the $CNF_2$ compounds separately from the extract solution and the raffinate phase solution.

3. The method of concentrating and separating higher $NF_2$ adduct to an unsaturated organic compound having 4 $NF_2$ groups attached to carbon atoms from a lower $NF_2$ adduct of the unsaturated organic compound containing less than 4 $NF_2$ groups attached to carbon atoms, which comprises contacting the mixture of said adducts with a liquid hydrocarbon solvent for said adducts, contacting the solution of the said adducts in the hydrocarbon solvent having a dielectric constant of about 1.8 to 2.5 with a polyhalogenated organic liquid which is immiscible with the liquid hydrocarbon solvent in a mixing zone, separating the resulting solution of said adducts in the polyhalogenated organic solvent as an extract from a raffinate phase of the adducts in the hydrocarbon solvent, thereafter contacting said extract phase with a solution of the adducts in the hydrocarbon solvent with a solution of increased concentration of the higher adducts in the hydrocarbon solvent in an equilibration mixing zone to extract more of said higher adducts into the extract, and separating the resulting extract containing an increased amount of the higher adduct and decreased concentration of the lower adduct.

4. The method of separating tetrakis($NF_2$) furan adduct from bis($NF_2$) furan adduct, which comprises contacting a benzene solution of said adducts with a more polar perfluoro 3,4-dimethyl hexane solvent to extract a higher proportion of the tetrakis adduct than of the bis adduct, and in the more polar solvent immiscible with the benzene, separating the resulting extraction from the benzene solution and recovering the tetrakis adduct from the more polar solvent extract.

No references cited.

NICHOLAS S. RIZZO, *Primary Examiner.*

C. D. QUARFORTH, L. R. VERTIZ, *Examiners.*

L. A. SEBASTIAN, J. W. WHISLER,
*Assistant Examiners.*